United States Patent
Igawa et al.

(10) Patent No.: US 11,094,475 B2
(45) Date of Patent: Aug. 17, 2021

(54) SEPARATOR FOR ELECTROCHEMICAL ELEMENT AND ELECTROCHEMICAL ELEMENT

(71) Applicant: NIPPON KODOSHI CORPORATION, Kochi (JP)

(72) Inventors: Atsushi Igawa, Kochi (JP); Naoki Fujimoto, Kochi (JP); Masahiko Ueta, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 0 days.

(21) Appl. No.: 16/967,236

(22) PCT Filed: Feb. 18, 2019

(86) PCT No.: PCT/JP2019/005791
§ 371 (c)(1),
(2) Date: Aug. 4, 2020

(87) PCT Pub. No.: WO2019/167690
PCT Pub. Date: Sep. 6, 2019

(65) Prior Publication Data
US 2021/0035745 A1    Feb. 4, 2021

(30) Foreign Application Priority Data

Feb. 27, 2018  (JP) .............................. JP2018-033361

(51) Int. Cl.
*H01G 11/52*     (2013.01)
*H01G 11/22*     (2013.01)
*H01G 11/58*     (2013.01)

(52) U.S. Cl.
CPC ............. *H01G 11/52* (2013.01); *H01G 11/22* (2013.01); *H01G 11/58* (2013.01)

(58) Field of Classification Search
None
See application file for complete search history.

(56) References Cited

U.S. PATENT DOCUMENTS

| | | | | |
|---|---|---|---|---|
| 2012/0003525 A1* | 1/2012 | Hashimoto | .............. | H01G 9/02 |
| | | | | 429/144 |
| 2015/0022951 A1* | 1/2015 | Tanaka | .................. | H01G 11/58 |
| | | | | 361/509 |
| 2016/0293338 A1* | 10/2016 | Tanaka | ..................... | H01G 9/02 |
| 2017/0133165 A1* | 5/2017 | Ichimura | ................ | H01G 11/58 |
| 2018/0145299 A1* | 5/2018 | Iwamuro | ........... | H01M 50/4295 |
| 2018/0261392 A1* | 9/2018 | Ichimura | ................ | H01G 9/155 |
| 2019/0318884 A1* | 10/2019 | Hayakawa | ............. | H01G 11/84 |
| 2019/0355950 A1* | 11/2019 | Wada | ................. | H01M 50/4295 |
| 2019/0392994 A1* | 12/2019 | Igawa | ............... | H01M 50/4295 |
| 2020/0027664 A1* | 1/2020 | Tanaka | .................. | H01G 4/16 |
| 2020/0044220 A1* | 2/2020 | Igawa | .................. | H01M 50/44 |
| 2020/0321161 A1* | 10/2020 | Wada | ....................... | H01G 9/02 |
| 2021/0118620 A1* | 4/2021 | Ochi | ..................... | H01G 9/145 |

* cited by examiner

*Primary Examiner* — Dion Ferguson
(74) *Attorney, Agent, or Firm* — Oliff PLC

(57) ABSTRACT

A separator for an electrochemical element suitable extends the service life of an electrochemical element under high temperature conditions. This separator for an electrochemical element is disposed between a pair of electrodes and is for separating the two electrodes from each other and retaining an electrolytic solution, wherein the separator contains a cellulose-based fiber, and the limiting viscosity of the separator as measured by the measurement method specified in JIS P 8215 is in a range of 150-500 ml/g.

7 Claims, No Drawings

SEPARATOR FOR ELECTROCHEMICAL ELEMENT AND ELECTROCHEMICAL ELEMENT

TECHNICAL FIELD

The present invention relates to a separator for an electrochemical element and an electrochemical element using the separator for an electrochemical element.

BACKGROUND ART

Examples of an electrochemical element include an aluminum electrolytic capacitor, a conductive polymer aluminum solid electrolytic capacitor, a conductive polymer hybrid aluminum electrolytic capacitor, an electric double layer capacitor, a lithium ion capacitor, a lithium ion secondary battery, and a lithium primary battery.

Further, these electrochemical elements have been adopted in many fields, for example, automobile-related devices, digital devices, renewable energy-related devices such as wind power generation and photovoltaic power generation, and a communication device such as a smart meter.

Recently, in automobile-related devices and digital devices where electronization has progressed, it has been required to extend the service life for components mounted on these devices. The extension in service life of the components mounted on these devices is one of factors for an extension in service life of the devices themselves, which is a large advantage.

For example, in a case of use for an automobile, there are an increasing number of cases where an electrochemical element is installed in a high-temperature engine room. In addition, these devices are often exposed to direct sunlight outdoors when being used for power storage facilities or power generation facilities, for example. An electrochemical element used for such an application requires improvement in reliability under a higher temperature environment more and more.

The above-described electrochemical element adopts a basic structure in which an anode and a cathode are separated from each other by a separator, and the separator retains an electrolytic solution. Therefore, the separator needs to have many functions such as resistance to burrs of an electrode member, a property of retaining the electrolytic solution, low resistance after impregnation with the electrolytic solution, and being low ionic impurities as a material, and a cellulose-based separator is adopted as a material satisfying these functions.

As the cellulose-based separator, a separator made of 100% natural cellulose, a separator made of a mixture of natural cellulose and regenerated cellulose, a separator made of a mixture of regenerated cellulose and a synthetic fiber, a separator made of 100% regenerated cellulose, and the like have been proposed.

In addition, many techniques have been disclosed in order to pursue the resistance to burrs of the separator, the property of retaining the electrolytic solution, and the low resistance of the separator.

Patent Literature 1 particularly discloses a separator for a low-voltage aluminum electrolytic capacitor, and discloses a technique for reducing resistance of a separator after impregnation with an electrolytic solution by optimizing a shape of a fiber constituting the separator.

Patent Literature 2 discloses a separator contributing to an increase in voltage of an aluminum electrolytic capacitor, and discloses a technique for improving short circuit resistance of the separator in a high-density layer in which cellulose has been highly beaten and improving an impregnation property of an electrolytic solution in a low-density layer.

Patent Literature 3 discloses a separator constituted by sisal hemp pulp which is a natural cellulose fiber and solvent-spun rayon which is a regenerated cellulose fiber, and discloses a technique for enhancing the denseness of the separator and reducing a short-circuit failure rate of an electric double layer capacitor.

Patent Literature 4 discloses a technique for improving absorbency of an electrolytic solution by constituting a separator using a cellulose fiber and a synthetic fiber whose fiber lengths have been controlled.

Patent Literature 5 discloses a separator having an extremely high denseness and further having excellent ion permeability, and discloses a technique that can contribute to reduction in short-circuit failure of an electric double layer capacitor, reduction in internal resistance, and increase in volume energy density.

CITATION LIST

Patent Literature

Patent Literature 1: JP S62-126622 A
Patent Literature 2: JP H06-168848 A
Patent Literature 3: JP H09-45586 A
Patent Literature 4: JP 2012-222266 A
Patent Literature 5: JP 2000-3834 A

SUMMARY OF INVENTION

Technical Problem

Conventionally, ionic impurities contained in a separator have been managed as a method of extending the service life of an electrochemical element under high temperature conditions. Even in Patent Literatures 1 to 5, it is considered important to reduce the ionic impurities contained in the separator for the purpose of preventing the corrosion of the electrode member.

As a concrete method of managing the amount of ionic impurities, the content of chlorine is measured and managed by a method specified in "JIS C 2300-2 Cellulosic papers for electrical purposes—Part 2: Methods of test '17 Content of chlorine'".

For example, in an aluminum electrolytic capacitor, a separator becomes impregnated with an electrolytic solution at the time of incorporating the separator in an electrochemical element. However, if the separator contains anionic impurities, anionic impurities that have been extracted from the separator into the electrolytic solution erode an oxide film of an anode foil. If the anionic impurities erode the anode oxide film, there occur problems that a voltage of the electrochemical element does not rise to a rated voltage, that capacitance drops due to reduction in the area of the foil, and that a valve operates by generation of an oxygen gas and a hydrogen gas due to foil corrosion.

In order to avoid the above-described problems, the management of the content of chlorine by the method specified in JIS C 2300-2 can be said to be a suitable means.

However, there is a limit to adopt this method alone from the viewpoint of extending the service life of an electrochemical element under high temperature conditions, which is required in recent years.

As a result of analyzing electrochemical elements such as capacitors and electric double layer capacitors, it has been found that it is necessary to improve a lyophilic property and a liquid-retaining property of the separator with respect to the electrolytic solution in order to extend the service life of the electrochemical element, which is required in recent years. In other words, it has been found that it is important for the separator to retain the electrolytic solution in the element against a long-term use, a temperature change, and a vibration.

Cellulose is known to be a material with good hydrophilicity and lipophilicity, and a cellulose-based separator has been widely used as a separator for an electrochemical element in order to improve the lyophilic property of the separator. A separator made of only a film made of a synthetic resin or a synthetic fiber, which is not a cellulose-based separator, has a lower lyophilic property than the cellulose-based separator.

In addition, there is a method of controlling the density of a cellulose-based separator in order to improve a liquid-retaining property of a separator. As for the cellulose-based separator, a separator having a desired density can be obtained as a cellulose fiber serving as its constituent material is beaten (subjected to mechanical shearing in water) to form a sheet by a papermaking method.

However, it has been revealed that the non-uniformity (partial drainage) occurs in the retaining amount of the electrolytic solution gradually even with the separator having the density that optimizes the retaining amount of the electrolytic solution if the separator is used for a long time under a high temperature environment.

In this manner, it has been difficult to achieve the extension of the service life under high temperature conditions, which is required for electrochemical elements in recent years only with the techniques that have been conventionally used.

In addition, it has been also required to reduce heat generation of the electrochemical element itself in order to extend the service life of the electrochemical element under high temperature conditions. In order to reduce the heat generation of the electrochemical element, it is advantageous to lower the resistance of the electrochemical element, and the separator is also required to have lower resistance than ever before.

The present invention has been made in view of these problems, and provides a separator capable of preventing non-uniformity of the amount of an electrolytic solution retained by the separator and suitable for extension of the service life of an electrochemical element under high temperature conditions even if the electrochemical element is used for a long time under a high temperature environment.

Solution to Problem

A separator for an electrochemical element of the present invention is a separator for an electrochemical element that is disposed between a pair of electrodes and is for separating the two electrodes from each other and retaining an electrolytic solution, and is characterized in that the separator contains a cellulose-based fiber, and the limiting viscosity of the separator as measured by the measurement method specified in JIS P 8215 is in a range of 150 to 500 ml/g.

In the separator for an electrochemical element of the present invention, the cellulose-based fiber may contain a regenerated fiber.

In addition, the regenerated fiber may be a solvent-spun cellulose fiber.

The separator for an electrochemical element of the present invention can be configured such that the total content of chlorine of the separator is 30 ppm or less.

The total content of chlorine of the separator for an electrochemical element of the present invention is the amount of chlorine "quantitatively determined by ion chromatography by burning and decomposing the separator by a quartz tube combustion method and causing a generated gas to be absorbed by an absorption liquid", and is the total amount of chlorine contained in the separator, which is different from the content of chloride ions extracted into water from the separator that has been conventionally controlled.

An electrochemical element of the present invention is characterized by using the separator for an electrochemical element of the present invention.

In the electrochemical element of the present invention, the electrochemical element can employ an aluminum electrolytic capacitor or an electric double layer capacitor.

The limiting viscosity of the conventional separator using a natural fiber is about 600 to 1000 ml/g. In addition, the limiting viscosity of the separator using a solvent-spun cellulose fiber which is a regenerated cellulose fiber is also 600 ml/g or more. It is generally considered that the fiber is less likely to disintegrate and is stronger as the limiting viscosity increases.

As a result of intensive studies conducted by the present inventors for the purpose of preventing non-uniformity of the amount of the electrolytic solution retained by the separator, it has been found that it is necessary to control the limiting viscosity of the separator. When setting the limiting viscosity in the range of 150 to 500 ml/g, it is possible to provide the separator that improves affinity and a retaining property of the separator with the electrolytic solution and is suitable for extension of the service life of the electrochemical element under high temperature conditions, which has been difficult conventionally.

Advantageous Effects of Invention

According to the present invention described above, it is possible to provide the electrochemical element that suppresses a decrease in capacitance and a decrease in voltage when used for a long time under a high temperature environment and also reduces heat generation during the use.

According to the present invention, it is also possible to provide the separator with the reduced ionic impurities, and it is possible to contribute to the extension of the service life of the electrochemical element under high temperature conditions by using this separator. In addition, it is possible to further extend the service life of the capacitor even when the capacitor is not used under the high temperature environment, that is, even when the capacitor is used in a conventional temperature range.

DESCRIPTION OF EMBODIMENTS

Embodiments according to the present invention will be described hereinafter.

Conventionally, ionic impurities in a separator have been reduced mainly by washing a fiber to suppress deterioration in performance when used in an electrochemical element.

However, with such a method, it is difficult to extend the service life of the electrochemical element under a high temperature environment, which is required in recent years as described above.

A separator for an electrochemical element of the present invention is a separator for an electrochemical element that is disposed between a pair of electrodes and is capable of separating the two electrodes from each other and retaining an electrolytic solution containing an electrolyte, wherein the separator contains a cellulose-based fiber, and the limiting viscosity of the separator as measured by the measurement method specified in JIS P 8215 is in a range of 150 to 500 ml/g.

According to the measurement method specified in JIS P 8215, a diluted aqueous solution of copper ethylenediamine (CED) is used as a solvent, cellulose is dissolved in this solvent, and the limiting viscosity is measured.

Note that JIS P 8215 specifies two methods of method A "measurement of limiting viscosity number of cellulose at dilute concentration" and method B "measurement of limiting viscosity number at constant shear rate".

In the present invention, either method A or method B may be adopted to measure the limiting viscosity. This is because no large difference occurs between a measured value by method A and a measured value by method B when the same cellulose is measured.

As the limiting viscosity of the separator is controlled within the range of 150 to 500 ml/g, it is possible to obtain the separator suitable for an extension of the service life of a capacitor or an electric double layer capacitor under high temperature conditions.

The limiting viscosity is a numeric value that is also used to calculate the degree of polymerization of pulp, and is measured in order to evaluate the degree of disintegration of cellulose in digesting and bleaching steps in manufacturing steps. A higher limiting viscosity indicates a higher degree of polymerization of cellulose. That is, it is generally considered that the fiber is less likely to disintegrate and is stronger as the limiting viscosity increases. So far, a fiber having a high degree of polymerization has been preferred as a material used for the separator from the viewpoint of suppressing deterioration such as the fiber disintegration.

The limiting viscosity of cellulose has been adopted instead of the degree of polymerization of cellulose in the present invention, and the reason therefor is as follows.

The degree of polymerization of cellulose is generally obtained by the following formula.

$$P=\{[\eta]/(M^a \cdot K_m)\}^{1/a}$$

P: Degree of polymerization
$[\eta]$: Limiting viscosity
M: Molecular weight of monomer (162.15)
a: Constant
$K_m$: Constant Here, a and $K_m$ differ depending on a type of cellulose. Thus, the limiting viscosity $[\eta]$ has been adopted for the purpose of evaluating the separator regardless of a material type of cellulose.

The limiting viscosity of the conventional separator using a natural fiber is about 600 to 1000 ml/g. In addition, the limiting viscosity of the separator using a solvent-spun cellulose fiber which is a regenerated cellulose fiber is also 600 ml/g or more.

If the limiting viscosity of the separator exceeds 500 ml/g, the resistance gradually increases or the capacitance gradually decreases under a high temperature environment at the time of using the separator in the electrochemical element.

On the other hand, if the limiting viscosity of the separator is less than 150 ml/g, short-circuit failure is likely to occur at the time of using the separator in the electrochemical element.

A reason for this is considered as follows.

A cellulose fiber is configured by further forming a bundle of microfibrils each of which is a bundle of cellulose molecules. In addition, a large number of hydrogen binding strongly bind/bond between the cellulose molecules and between the microfibrils. When the fiber is immersed in an electrolytic solution, the electrolytic solution penetrates between the cellulose molecules and the microfibrils.

When the limiting viscosity is too high, the electrolytic solution is less likely to penetrate between the cellulose molecules or between the microfibrils since the binding/bonding inside the fiber is strong, and the property of retaining the electrolytic solution and the lyophilic property of the fiber are low.

On the other hand, when the limiting viscosity is too low, it indicates that the binding/bonding inside the fiber is weak. Therefore, there are a risk that the fiber may be disintegrated during the manufacturing process of the separator, a risk that characteristics of the electrochemical element may deteriorate due to the gradual decomposition of the fiber constituting the separator when the electrochemical element using this separator is placed under a high temperature environment, and a risk that the separator may be disintegrated and cause a short-circuit failure.

When the separator of the present invention having the limiting viscosity in the range of 150 to 500 ml/g is used, it is possible to improve a liquid-retaining property and a lyophilic property of the separator, to prevent the non-uniformity of the retaining amount of the electrolytic solution, and to extend the service life of the electrochemical element. In addition, this also enables reduction in resistance of the electrochemical element.

In addition, when the limiting viscosity of the cellulose-based fiber falls within the above range, water easily penetrates into the inside of the fiber when the fiber is washed in the manufacturing process of the separator or when the fiber is beaten. Thus, not only a surface layer of the fiber but also ionic impurities inside the fiber are extracted, and ionic impurities of the separator are easily reduced. Therefore, even if the electrochemical element using the separator of the present invention is used under the high temperature environment, impurities eluted from the inside of the separator into the electrolytic solution can be reduced.

Since the cellulose-based fiber has the limiting viscosity in the range of 150 to 500 ml/g, the separator of the present invention enhances the lyophilic property and the liquid-retaining property of the fiber to lower the resistance while maintaining the durability required as the separator for an electrochemical element, and can efficiently remove the ionic impurities.

From the viewpoint of the balance between the durability of the fiber and the lyophilic property and the liquid-retaining property, the limiting viscosity of the cellulose-based fiber is more preferably 200 to 400 ml/g, and still more preferably 250 to 350 ml/g.

As the cellulose-based fiber used in the present invention, regenerated cellulose fibers obtained by dissolving cellulose and then regenerating the cellulose in a poor solvent bath are preferable since it is easier to control the limiting viscosity as compared to natural cellulose fibers.

Among the regenerated cellulose fibers, a solvent-spun cellulose that is dissolved and regenerated without undergoing a chemical change of cellulose is more preferable since it is possible to obtain a high-purity regenerated cellulose fiber. Even with the regenerated cellulose fibers, however, a cupra fiber, a viscose rayon fiber, and a polynosic rayon fiber contain a large amount of impurities such as copper and sulfate ions due to production methods, and thus, are not suitable.

In addition, the cellulose-based fiber used in the present invention is preferably beaten and used from the viewpoint of removing the impurities described above.

When such a cellulose-based fiber is used, it is possible to obtain the separator which has the good lyophilic property and liquid-retaining property and from which the ionic impurities inside the fiber have been removed.

The total content of chlorine of the separator of the present invention measured by a quartz tube combustion method is preferably 30 ppm or less.

The total content of chlorine of the separator of the present invention is the amount of chlorine "quantitatively determined by ion chromatography by burning and decomposing the separator by a quartz tube combustion method and causing a generated gas to be absorbed by an absorption liquid", and is the total amount of chlorine contained in the separator, which is different from the amount of chloride ions extracted into water from the separator that has been conventionally controlled.

The total content of chlorine contained in the separator is preferably 30 ppm or less. It is more preferably 15 ppm or less, and still more preferably 10 ppm or less.

If the total chlorine contained in the separator exceeds 30 ppm in a case where the electrochemical element is an aluminum electrolytic capacitor, chlorine ionizes and leaches into the electrolytic solution that has been impregnated and retained in the separator, and attacks an anode oxide film, which results in a gas leakage or a liquid leakage due to a valve operation, or a short circuit.

In a case where the electrochemical element is an electric double layer capacitor (electric double layer capacitor), chlorine ionizes and leaches into the electrolytic solution that has been impregnated and retained in the separator, and attacks an aluminum foil, which is a current collector, which results in a decrease in capacitance and an increase in resistance.

As long as the cellulose-based fiber has the limiting viscosity in the range of 150 to 500 ml/g in the separator of the present invention and is in the range that does not hinder other functions required as the separator, fibers other than the regenerated cellulose fiber can also be used without being particularly limited.

Although a method of manufacturing the cellulose-based fiber used in the present invention is not particularly limited, a digesting method such as an alkali method, a sulfate method (kraft method), and a sulfite method can be adopted for pulp, which is a raw material of the cellulose-based fiber in order to control the limiting viscosity and obtain the high purity. In addition, the purity may be further enhanced by performing a hydrolysis treatment before or after digesting. Further, a bleaching treatment may be performed. Note that chlorine-free bleaching is preferable from the viewpoint of residual chloride ions in the case of performing the bleaching, and complete chlorine-free bleaching is more preferable among types of chlorine-free bleaching.

Further, when such a raw material is dissolved and regenerated, the regenerated cellulose fiber having a desired limiting viscosity can be obtained.

However, a method of manufacturing the fiber serving as the raw material of the separator is not limited, and is not limited to the above-described digesting method and bleaching method.

In general, a thickness of the separator is about 10 to 80 µm and a density of the separator is about 0.25 to 1.00 g/cm³, and further, there is also a separator having a multilayer structure in which sheets each having the above thickness and density are combined.

In the present invention, however, the thickness and density of the separator are not particularly limited as long as the limiting viscosity of the cellulose-based fiber is 150 to 500 ml/g.

As described above, the separator using the cellulose-based fiber whose limiting viscosity is 500 ml/g or less can enhance the lyophilic property and the liquid-retaining property to lower the resistance, and further, can easily remove the ionic impurities in the manufacturing process of the separator. Further, if the separator has the total content of chlorine of 30 ppm or less, it is possible to suppresses deterioration of capacitor characteristics, and further, to contribute to reduction of the valve operation or the liquid leakage caused by the short-circuit failure or an increase in internal pressure, for example, even when the capacitor is used under a high temperature environment such as 150° C.

Further, the separator using the cellulose-based fiber whose limiting viscosity is 150 ml/g or more can suppress deterioration of the fiber constituting the separator and contribute to suppression of deterioration of the capacitor characteristics, for example, even when the capacitor is used under the high temperature environment such as 150° C.

Furthermore, it is possible to extend the service life as compared with a capacitor using a conventional separator even when the capacitor is not used at a temperature as high as recently demanded.

Hereinafter, various Examples, Comparative Examples, and the like of the separator for an electrochemical element and the electrochemical element including the separator for an electrochemical element according to the present invention will be described in detail.

[Limiting Viscosity]

Limiting viscosity numbers of each fiber, pulp, and a separator were obtained according to "6. Method A-measurement of cellulose limiting viscosity at dilute concentration" specified in "JIS P 8215 Cellulose in dilute solution-Determination of limiting viscosity number-Method in cupri-ethylene-diamine (CED) solution", and taken as limiting viscosities.

Note that a limiting viscosity of a synthetic fiber was not measured.

[Total Content of Chlorine]

A pretreatment by a quartz tube combustion method described in "JIS K 0127 General rules for ion chromatography '6.3.5 Combustion pretreatment of organic compound'" was performed to cause a generated gas to be absorbed by an absorption liquid, and a resultant was used for ion chromatography measurement. That is, all test pieces were completely burned and gasified to measure the total amount of chlorine thus generated.

[Content of Extracted Chlorine]

An extract was obtained by the method specified in "17.2.3 Limit method (extraction third method)" of "JIS C 2300-2 Cellulosic papers for electrical purposes—Part 2: Methods of test '17 Content of chlorine'". Using this extract, the content of chlorine of the extract was measured according to "17.2.4.3 Ion chromatography (measurement)", and was taken as the content of extracted chlorine.

[CSF]

The freeness of a fiber used for a separator was measured according to "JIS P 8121-2 'Pulps-Determination of drainability—Part 2: Canadian Standard Freeness Method'", and taken as CSF.

Table 1 shows the limiting viscosities and chlorine contents of various pulps and fibers used in the respective Examples and Comparative Examples. Note that the content of chlorine in Table 1 is a value measured before beating.

TABLE 1

| | Classification | Material type | Limiting viscosity (ml/g) | Content of chlorine (ppm) | |
|---|---|---|---|---|---|
| | | | | Total chlorine | Extracted chlorine |
| Fiber1 | Regenerated fiber | Solvent-spun cellulose | 475 | 35.5 | 1.5 |
| Fiber2 | Regenerated fiber | Solvent-spun cellulose | 390 | 14.9 | 0.7 |
| Fiber3 | Regenerated fiber | Solvent-spun cellulose | 340 | 9.4 | 0.3 |
| Fiber4 | Regenerated fiber | Solvent-spun cellulose | 255 | 56.6 | 1.0 |
| Fiber5 | Regenerated fiber | Solvent-spun cellulose | 205 | 33.0 | 1.9 |
| Fiber6 | Regenerated fiber | Solvent-spun cellulose | 153 | 23.1 | 1.6 |
| Fiber7 | Regenerated fiber | Solvent-spun cellulose | 620 | 75.2 | 1.9 |
| Fiber8 | Regenerated fiber | Solvent-spun cellulose | 135 | 80.0 | 2.2 |
| Fiber9 | Synthetic fiber | Polyester | — | 2.6 | 1.2 |
| Fiber10 | Synthetic fiber | Polyester binder | — | 3.1 | 1.4 |
| Pulp1 | Wooden material | Coniferous tree | 625 | 5.1 | 2.0 |
| Pulp2 | Non-wooden material | Linter | 780 | 73.2 | 3.3 |
| Pulp3 | Wooden material | Coniferous tree | 650 | 150.3 | 5.1 |
| Pulp4 | Non-wooden material | Sisal hemp | 685 | 80.0 | 2.9 |

As apparent from Table 1, it is understood that it does not necessarily mean that the total content of chlorine is low even if the fiber or pulp has a very low content of extracted chlorine of 2 ppm or less.

Using the respective fibers and pulps described in Table 1, separators of the following Examples, Comparative Examples, and Conventional Examples were produced.

Note that all the separators were formed by a papermaking method in the present embodiment, but methods of forming the separators are not limited to the papermaking method.

Various physical properties of the separator of the present embodiment were measured by the following methods.

[Thickness]

A thickness of a separator was measured by a method of folding a sheet into ten sheets in "5.1.3 Case of measuring thickness by folding sheet" using a micrometer in "5.1.1 Measuring instrument and measurement method a) Case of using outer micrometer" specified in "JIS C 2300-2 'Cellulosic papers for electrical purposes—Part 2: Methods of test' 5.1 Thickness".

[Density]

A density of a separator in a bone dry condition was measured by a method specified in method B of "JIS C 2300-2 'Cellulosic papers for electrical purposes—Part 2: Methods of test' 7.0 A Density".

[Limiting Viscosity of Separator]

A limiting viscosity of a separator was measured by the same method as the above [Limiting Viscosity].

Note that a limiting viscosity of a separator made of only a synthetic fiber was not measured.

In addition, a value of a limiting viscosity of a used cellulose fiber was used as a value of a limiting viscosity of a separator prepared by mixing a synthetic fiber and a cellulose fiber.

[Total Content of Chlorine and Content of Extracted Chlorine]

The total content of chlorine and the content of extracted chlorine were measured by the same method as the above [Content of Chlorine of Pulp and Fiber].

Example 1

Only CSF 0 ml of Fiber 1 beaten by a disc refiner was subjected to Fourdrinier papermaking to obtain a separator of Example 1.

This separator had a thickness of 80 μm and a density of 0.85 g/cm$^3$. In addition, a limiting viscosity was 470 ml/g, the total content of chlorine was 23.1 ppm, and the content of extracted chlorine was 0.4 ppm.

Example 2

Only CSF 10 ml of Fiber 2 beaten by a disc refiner was subjected to Fourdrinier papermaking to obtain a separator of Example 2.

This separator had a thickness of 60 μm and a density of 0.40 g/cm$^3$. In addition, a limiting viscosity was 388 ml/g, the total content of chlorine was 9.2 ppm, and the content of extracted chlorine was 0.2 ppm.

Example 3

Only CSF 0 ml of Fiber 3 beaten by a disc refiner was subjected to Fourdrinier papermaking to obtain a separator of Example 3.

This separator had a thickness of 40 μm and a density of 0.48 g/cm$^3$. In addition, a limiting viscosity was 339 ml/g, the total content of chlorine was 5.5 ppm, and the content of extracted chlorine was 0.1 ppm.

Example 4

Only CSF 0 ml of Fiber 4 beaten by a disc refiner was subjected to Fourdrinier papermaking to obtain a separator of Example 4.

The separator had a thickness of 30 μm and a density of 0.45 g/cm$^3$. In addition, a limiting viscosity was 252 ml/g, the total content of chlorine was 28.9 ppm, and the content of extracted chlorine was 0.5 ppm.

Example 5

Only CSF 0 ml of Fiber 5 beaten by a disc refiner was subjected to Fourdrinier papermaking to obtain a separator of Example 5.

This separator had a thickness of 25 μm and a density of 0.40 g/cm$^3$. In addition, a limiting viscosity was 206 ml/g, the total content of chlorine was 14.6 ppm, and the content of extracted chlorine was 0.3 ppm.

Example 6

Only CSF 0 ml of Fiber 6 beaten by a disc refiner was subjected to Fourdrinier papermaking to obtain a separator of Example 6.

This separator had a thickness of 10 μm and a density of 0.30 g/cm$^3$. In addition, a limiting viscosity was 153 ml/g, the total content of chlorine was 5.7 ppm, and the content of extracted chlorine was 0.4 ppm.

Example 7

A raw material of CSF 0 ml obtained by beating 50% by mass of Fiber 3 with a conical refiner, and 50% by mass of unbeaten Fiber 9 (CSF 780 ml) were subjected to Fourdrinier papermaking to obtain a separator of Example 7.

This separator had a thickness of 40 μm and a density of 0.38 g/cm$^3$. In addition, a limiting viscosity was 331 ml/g, the total content of chlorine was 3.7 ppm, and the content of extracted chlorine was 0.3 ppm.

Example 8

A sheet having a thickness of 20 μm and a density of 0.85 g/cm$^3$ obtained by Fourdrinier papermaking using only CSF 0 ml of Pulp 1 beaten with a disc refiner and a sheet having a thickness of 40 μm and a density of 0.45 g/cm$^3$ obtained by cylinder papermaking using only CSF 50 ml of Fiber 4 beaten with a disc refiner were laminated to each other to obtain a separator of Example 8.

This separator had a thickness of 60 μm and a density of 0.58 g/cm$^3$. In addition, a limiting viscosity was 390 ml/g, the total content of chlorine was 16.1 ppm, and the content of extracted chlorine was 0.5 ppm.

Comparative Example 1

Only CSF 0 ml of Fiber 7 beaten by a disc refiner was subjected to Fourdrinier papermaking to obtain a separator of Comparative Example 1.

This separator had a thickness of 40 μm and a density of 0.40 g/cm$^3$. In addition, a limiting viscosity was 610 ml/g, the total content of chlorine was 64.0 ppm, and the content of extracted chlorine was 0.7 ppm.

Note that Comparative Example 1 is the separator manufactured with reference to Example 1 of Patent Literature 5.

Comparative Example 2

Only CSF 0 ml of Fiber 8 beaten by a disc refiner was subjected to Fourdrinier papermaking to obtain a separator of Comparative Example 2.

This separator had a thickness of 80 μm and a density of 0.75 g/cm$^3$. In addition, a limiting viscosity was 135 ml/g, the total content of chlorine was 9.7 ppm, and the content of extracted chlorine was 0.6 ppm.

Comparative Example 3

50% by mass of Fiber 9 and 50% by mass of Fiber 10 were mixed and subjected to cylinder papermaking to obtain a separator of Comparative Example 3.

This separator had a thickness of 40 μm and a density of 0.35 g/cm$^3$. In addition, the total content of chlorine was 2.1 ppm, and the content of extracted chlorine was 0.4 ppm.

This separator is a separator made of only a synthetic fiber, and a limiting viscosity thereof was not measured.

Conventional Example 1

According to Table 1 of Patent Literature 1, only CSF 400 ml of Pulp 4 beaten by a disc refiner was subjected to cylinder papermaking to obtain a separator of Conventional Example 1.

This separator had a thickness of 50 μm and a density of 0.50 g/cm$^3$. In addition, a limiting viscosity was 680 ml/g, the total content of chlorine was 55.8 ppm, and the content of extracted chlorine was 0.4 ppm.

Conventional Example 2

According to Example 1 of Patent Literature 3, 60% by mass of unbeaten Pulp 4 (CSF 660 ml) and a raw material obtained by beating 40% by mass of Fiber 7 into 100 ml of CSF with a conical refiner were mixed and subjected to Fourdrinier papermaking to obtain a separator of Conventional Example 2.

This separator had a thickness of 70 μm and a density of 0.48 g/cm$^3$. In addition, a limiting viscosity was 604 ml/g, the total content of chlorine was 47.3 ppm, and the content of extracted chlorine was 0.5 ppm.

Conventional Example 3

According to Example 2 of Patent Literature 4, 50% by mass of unbeaten Fiber 7 (CSF 780 ml) and a raw material obtained by beating 50% by mass of Fiber 9 into 0 ml of CSF with a conical refiner were mixed and subjected to cylinder papermaking to obtain a separator of Conventional Example 5.

This separator had a thickness of 25 μm and a density of 0.55 g/cm$^3$. In addition, a limiting viscosity was 610 ml/g, the total content of chlorine was 33.0 ppm, and the content of extracted chlorine was 0.6 ppm.

Conventional Example 4

According to Example 3 of Patent Literature 2, a layer with a thickness of 25 μm and a density of 0.95 g/cm$^3$, obtained by Fourdrinier papermaking using a raw material of CSF 0 ml of Pulp 3 beaten with a disc refiner, and a layer with a thickness of 25 μm and a density of 0.32 g/cm$^3$, obtained by cylinder papermaking using a raw material of CSF 700 ml in which Pulp 2 and Pulp 3 were mixed at a mass ratio of 1:1, were laminated to each other to obtain a separator of Conventional Example 4.

This separator had a thickness of 50 μm and a density of 0.64 g/cm$^3$, and a mass ratio between a Fourdrinier layer to a cylinder layer was Fourdrinier 74: cylinder 26. Therefore, a mass ratio of each pulp in the entire separator is Pulp 3:Pulp 2=87:13. In addition, a limiting viscosity was 667 ml/g, the total content of chlorine was 51.8 ppm, and the content of extracted chlorine was 0.4 ppm.

Table 2 shows evaluation results of the separators of Examples, Comparative Examples, and Conventional Examples.

TABLE 2

|  | Used pulp | Thickness (μm) | Density (g/cm³) | Limiting viscosity (ml/g) | Content of chlorine (ppm) | |
|---|---|---|---|---|---|---|
|  |  |  |  |  | Total chlorine | Extracted chlorine |
| Example1 | Fiber1: 100% | 80 | 0.85 | 470 | 23.1 | 0.4 |
| Example2 | Fiber2: 100% | 60 | 0.40 | 388 | 9.2 | 0.2 |
| Example3 | Fiber3: 100% | 40 | 0.48 | 339 | 5.5 | 0.1 |
| Example4 | Fiber4: 100% | 30 | 0.45 | 252 | 28.9 | 0.5 |
| Example5 | Fiber5: 100% | 25 | 0.40 | 206 | 14.6 | 0.3 |
| Example6 | Fiber6: 100% | 10 | 0.30 | 153 | 5.7 | 0.4 |
| Example7 | Fiber3: 50% Fiber9: 50% | 40 | 0.38 | 331 | 3.7 | 0.3 |
| Example8 | Fiber4: 51% Pulp1: 49% | 60 | 0.58 | 390 | 16.1 | 0.5 |
| Comparative example1 | Fiber7: 100% | 40 | 0.40 | 610 | 64.0 | 0.7 |
| Comparative example2 | Fiber8: 100% | 80 | 0.75 | 135 | 9.7 | 0.6 |
| Comparative example3 | Fiber9: 50% Fiber10: 50% | 40 | 0.35 | — | 2.1 | 0.4 |
| Conventional example1 | Pulp4: 100% | 50 | 0.50 | 680 | 55.8 | 0.4 |
| Conventional example2 | Fiber7: 40% Pulp4: 60% | 70 | 0.48 | 604 | 47.3 | 0.5 |
| Conventional example3 | Fiber7: 50% Fiber9: 50% | 25 | 0.55 | 610 | 33.0 | 0.6 |
| Conventional example4 | Pulp3: 87% Pulp2: 13% | 50 | 0.64 | 667 | 51.8 | 0.4 |

Next, electrochemical elements were produced using the separators of the Examples and Comparative Examples shown in Table 2.

The separators of Examples 1 to 7, Comparative Examples 1 to 3, Conventional Examples 1 to 3 were respectively used to produce aluminum electrolytic capacitors having a rated voltage of 16 V, a rated capacitance of 550 μF, an outer diameter of 10 mm, a height of 20 mm and electric double layer capacitors having a rated voltage of 2.5 V, a rated capacitance of 300 F, a diameter of 35 mm, and a height of 60 mm.

In addition, the separators of Example 8 and Conventional Example 4 were respectively used to produce aluminum electrolytic capacitors having a rated voltage of 450 V, a rated capacitance of 3.3 ρF, an outer diameter of 12 mm, and a height of 20 mm.

Note that the capacitance immediately after production was lower than the rated capacitance by 20% or more in the aluminum electrolytic capacitor and the electric double layer capacitor using the separator of Comparative Example 3, and thus, detailed element evaluation was not performed.

Specific evaluation on the electrochemical elements produced using the separators of the respective Examples and Comparative Examples was performed with the following conditions and methods.

Note that all the electrochemical elements of the present embodiment were produced by being wound with a separator disposed between a pair of electrodes, housed in a bottomed cylindrical aluminum case, injected with an electrolytic solution for impregnation, and then, sealed with a sealing rubber.

Such a production method is the same for the aluminum electrolytic capacitor and the electric double layer capacitor except that an electrode member and an electrolytic solution are different from each other.

[Capacitance]

The capacitance of an aluminum electrolytic capacitor was obtained by the method of "4.7 Capacitance" specified in "JIS C 5101-1 'Fixed capacitors for use in electronic equipment—Part 1: Generic specification'".

In addition, the capacitance of an electric double layer capacitor was obtained by the constant current discharge method of "4.5 Capacitance" specified in "JIS C 5160-1 'Fixed electric double layer capacitor for use in electronic equipment—Part 1: Generic specification'".

[Impedance]

An impedance of an aluminum electrolytic capacitor was obtained by the method of "4.10 Impedance" specified in "JIS C 5101-1 'Fixed capacitors for use in electronic equipment—Part 1: Generic specification'".

S [Internal Resistance]

An internal resistance of an electric double layer capacitor was measured by the alternating current (a.c.) resistance method of "4.6 Internal resistance" specified in "JIS C 5160-1 'Fixed electric double layer capacitor for use in electronic equipment—Part 1: Generic specification'".

Furthermore, for the purpose of obtaining service life characteristics of the electrochemical elements using the separators of Examples, Comparative Examples, and Conventional Examples, a high-temperature load test and a long-term load test were performed to calculate a difference in characteristics and the like before and after the tests.

[Characteristic Change Rate of Aluminum Electrolytic Capacitor after High-Temperature Load Test]

A high-temperature load test of an aluminum electrolytic capacitor was performed under the following conditions.

A rated DC voltage was applied for 1000 hours under an environment at 160° C.

The number of electrochemical elements short-circuited during this load test was counted and divided by the number of electrochemical elements used in the test to calculate a short-circuit failure rate.

In addition, after the load test, capacitance and a resistance value (impedance or internal resistance) after the load test were measured by the above measurement method.

Then, a difference between each capacitance after the load test and an initial capacitance was divided by the initial capacitance to calculate a capacitance decrease rate after the high-temperature load test.

In addition, a difference between a resistance value after the high-temperature load test and an initial resistance value was divided by the initial resistance value to calculate a resistance increase rate after the high-temperature load test.

Note that the short-circuit failure rate, the capacitance decrease rate, and the resistance increase rate are expressed in percentage.

[Characteristic Change Rate of Aluminum Electrolytic Capacitor after Long-Term Load Test]

A long-term load test of an aluminum electrolytic capacitor was performed under the following conditions.

A rated DC voltage was applied for 4000 hours under an environment at 130° C.

Then, a characteristic change rate after the long-term load test was measured and calculated by the same method as the characteristic change rate after the high-temperature load test.

[Floating Test of Electric Double Layer Capacitor]

A floating test of an electric double layer capacitor was performed under the following conditions.

A DC voltage of 2.7 V was applied for 1000 hours under an environment at 80° C.

After this test, capacitance and an internal resistance after the floating test were measured by the above measurement method, and a capacitance decrease rate and a resistance increase rate after the floating test were calculated similarly to the aluminum electrolytic capacitor.

[Cycle Test of Electric Double Layer Capacitor]

A cycle test of an electric double layer capacitor was performed under the following conditions.

Charging and discharging at 25000 cycles were performed with a current amount of 100 A under an environment at 60° C.

After this test, capacitance and an internal resistance after the cycle test were measured by the above measurement method, and a capacitance decrease rate and a resistance increase rate after the cycle test were calculated similarly to the aluminum electrolytic capacitor.

Table 3 shows evaluation results of the produced aluminum electrolytic capacitors, and Table 4 shows evaluation results of the electric double layer capacitors.

TABLE 3

| | Aluminum electrolytic capacitor | | | | | |
|---|---|---|---|---|---|---|
| | | High-temperature load test | | | Long-term load test | |
| | Impedance (Ω) | Short-circuit failure rate (%) | Capacitance decrease rate (%) | Resistance increase rate (%) | Capacitance decrease rate (%) | Resistance increase rate (%) |
| Example1 | 0.125 | 0 | 20 | 30 | 20 | 24 |
| Example2 | 0.118 | 0 | 17 | 27 | 12 | 16 |
| Example3 | 0.110 | 0 | 15 | 25 | 10 | 14 |
| Example4 | 0.105 | 0 | 12 | 22 | 21 | 25 |
| Example5 | 0.101 | 0.1 | 10 | 20 | 15 | 19 |
| Example6 | 0.097 | 0.2 | 8 | 18 | 11 | 15 |
| Example7 | 0.111 | 0 | 18 | 28 | 11 | 15 |
| Comparative example1 | 0.151 | 1.5 | 30 | 41 | 23 | 31 |
| Comparative example2 | 0.181 | 4.3 | 8 | 17 | 13 | 16 |
| Comparative example3 | — | — | — | — | — | — |
| Conventional example1 | 0.200 | 1.2 | 32 | 43 | 24 | 32 |
| Conventional example2 | 0.183 | 0.2 | 39 | 45 | 26 | 37 |
| Conventional example3 | 0.130 | 0.2 | 38 | 45 | 26 | 36 |
| Example8 | 20.5 | 0.2 | 17 | 20 | 13 | 17 |
| Conventional example4 | 30.1 | 1.1 | 31 | 42 | 25 | 31 |

TABLE 4

| | Electric double layer capacitor | | | | | |
|---|---|---|---|---|---|---|
| | | Floating test | | | Cycle test | |
| | Internal resistance (mΩ) | Short-circuit failure rate (%) | Capacitance decrease rate (%) | Resistance increase rate (%) | Capacitance decrease rate (%) | Resistance increase rate (%) |
| Example1 | 0.52 | 0 | 21 | 25 | 22 | 25 |
| Example2 | 0.48 | 0 | 18 | 22 | 15 | 17 |
| Example3 | 0.46 | 0 | 16 | 20 | 12 | 16 |
| Example4 | 0.44 | 0 | 13 | 17 | 22 | 25 |
| Example5 | 0.41 | 0 | 12 | 15 | 17 | 19 |
| Example6 | 0.39 | 0 | 10 | 13 | 13 | 17 |

TABLE 4-continued

| | Electric double layer capacitor | | | | | |
|---|---|---|---|---|---|---|
| | | Floating test | | | Cycle test | |
| | Internal resistance (mΩ) | Short-circuit failure rate (%) | Capacitance decrease rate (%) | Resistance increase rate (%) | Capacitance decrease rate (%) | Resistance increase rate (%) |
| Example7 | 0.45 | 0 | 20 | 23 | 13 | 17 |
| Comparative example1 | 0.65 | 0 | 31 | 35 | 25 | 30 |
| Comparative example2 | 0.88 | 1.2 | 8 | 17 | 13 | 16 |
| Comparative example3 | — | — | — | — | — | — |
| Conventional example1 | 0.9 | 2.1 | 31 | 37 | 27 | 31 |
| Conventional example2 | 0.81 | 0.1 | 34 | 43 | 30 | 34 |
| Conventional example3 | 0.55 | 0.1 | 34 | 41 | 29 | 33 |

As understood from Tables 3 and 4, values of the impedance of the aluminum electrolytic capacitors and values of the internal resistance of the electric double layer capacitors of the respective Examples are smaller than levels of those of Comparative Example 1 and the respective Conventional Examples. This is considered as a result of the enhanced electrolytic solution retaining property between the fibers constituting the separator and inside the fibers since the limiting viscosity of the separator of each of Examples is lower than those of Comparative Example 1 and the respective Conventional Examples.

Through the comparison of the respective Examples with Comparative Example 1 and the respective Conventional Examples, it is understood that the limiting viscosity of the separator is preferably 500 ml/g or less.

In addition, the short-circuit failure rate after the high-temperature load test of the electric double layer capacitor and the short-circuit failure rate after the floating test of the aluminum electrolytic capacitor of Comparative Example 2 are significantly higher than those of the respective Examples and Conventional Examples. It is considered that a reason therefor is that the fiber constituting the separator is decomposed in the high-temperature electrolytic solution since the limiting viscosity of the separator of Comparative Example 2 is too lower than those of the respective Examples and Conventional Examples.

Through the comparison of Comparative Example 2 with the respective Examples and Conventional Examples, it is understood that the limiting viscosity of the separator is preferably 150 ml/g or more.

The aluminum electrolytic capacitor and the electric double layer capacitor of Comparative Example 3 had the initial capacitance lower than the rated capacitance by 20% or more. This is considered as a result of the low lyophilic property and electrolytic solution retaining property of the separator since the separator of Comparative Example 3 is the separator made of only the synthetic fiber, and does not contain any cellulose-based fiber.

Through the comparison of Comparative Example 3 with the respective Examples, it is understood that the separator preferably contains 50% by mass or more of the cellulose-based fiber.

In addition, it is understood that the resistance of the electrochemical element can be reduced using the regenerated fiber through the comparison of Examples 1 to 6 made of only the solvent-spun cellulose fiber which is the regenerated fiber with Example 8 and Conventional Examples containing natural fibers.

The capacitance decrease rate and the resistance increase rate after the long-term load test of the aluminum electrolytic capacitor and the capacitance decrease rate and the resistance increase rate after the cycle test of the electric double layer capacitor of each of Examples are lower than the levels of those of the respective Conventional Examples. In addition, no short-circuit failure has occurred in almost all cases. The total content of chlorine of the separator of each of Examples is 30 ppm or less. This also indicates that the content of chloride ions inside the fiber constituting the separator is also low, and a reason thereof is considered that chloride ions are hardly extracted into the electrolytic solution even after the long-term test and do not attack the electrode member of the electrochemical element.

Through the comparison between the respective Examples and the respective Conventional Examples, it is understood that the total content of chlorine of the separator is preferably 30 ppm or less.

In addition, the initial impedance is significantly low, and both the capacitance decrease rate and the resistance increase rate after the high-temperature load test and the long-term load test are low in the aluminum electrolytic capacitor of Example 8 as compared with the aluminum electrolytic capacitor of Conventional Example 4. In addition, no short-circuit failure has occurred after the high-temperature load test. From this, it is understood that the service life of the electrochemical element can be extended under high temperature conditions and the resistance value can be reduced regardless of the rated voltage of the electrochemical element by using the separator of the present invention.

In addition, such a result has been obtained even if the content of extracted chlorine of the separator of Example 8 is greater than that of the separator of Conventional Example 4. Accordingly, it is understood that not the content of chlorine obtained by an extraction method, which has been conventionally studied, but the total content of chlorine is important in order to obtain the reliability and long service life of the aluminum electrolytic capacitor under the high temperature environment.

When comparing Fiber 3 and Fiber 6 listed in Table 1, the total content of chlorine of Fiber 6 is greater than the other by 50% or more, but the total contents of chlorine of the separators of Example 3 and Example 6 using these fibers are substantially the same. When comparing the total contents of chlorine of Fibers 1 to 6 in Table 1 and the total contents of chlorine of the separators of Examples 1 to 6 in Table 2 using only these fibers, it is understood that a removal rate of the total content of chlorine when used in the separator is higher as the limiting viscosity is lower.

On the other hand, a short-circuit failure is slightly generated in the aluminum electrolytic capacitors of Examples 5 and 6, and it is understood that the limiting viscosity is more preferably 200 to 400 ml/g, and still more preferably 250 to 350 ml/g considering Comparative Example 2 described above.

With the total content of chlorine of the separator, the capacitance decrease rate and the resistance increase rate after the long-term load test of the aluminum electrolytic capacitor, and the capacitance decrease rate and the resistance increase rate after the cycle test of the electric double layer capacitor of each of Examples, it is understood that the changes in these characteristics can be suppressed as the total content of chlorine of the separator decreases. From Examples 1 to 7, it is understood that the characteristic change can be suppressed more if the total content of chlorine of the separator is 15 ppm or less, and the characteristic change is further suppressed if the total content of chlorine of the separator is 10 ppm or less.

As described above, it is possible to contribute to the improvement of reliability in the severe usage environment required for electrochemical elements in recent years, the extension in service life, and the reduction in resistance by using the separator of the present invention having the limiting viscosity of 150 to 500 ml/g.

Examples in which the separator of the present embodiment is used for the aluminum electrolytic capacitor and the electric double layer capacitor have been described as above.

It is unnecessary to particularly limit the electrode material and the electrolytic solution material, other members, and the like in the electrochemical element according to the present invention, and various materials can be used.

In addition, the separator for an electrochemical element of the present invention can also be applied to electrochemical elements other than those described in the present embodiment, for example, electrochemical elements such as a lithium ion capacitor, a lithium primary battery, and a lithium ion secondary battery.

The invention claimed is:

1. A separator for an electrochemical element that is disposed between a pair of electrodes and is for separating the two electrodes from each other and retaining an electrolytic solution,
    wherein the separator contains a cellulose-based fiber, and
    a limiting viscosity of the separator as measured by a measurement method specified in JIS P 8215 is in a range of 150 to 500 ml/g.

2. The separator for an electrochemical element according to claim 1, wherein the cellulose-based fiber contains a regenerated fiber.

3. The separator for an electrochemical element according to claim 2, wherein the regenerated fiber is a solvent-spun cellulose fiber.

4. The separator for an electrochemical element according to claim 1, wherein a total content of chlorine of the separator for an electrochemical element is 30 ppm or less.

5. An electrochemical element comprising:
    a pair of electrodes; and
    a separator disposed between the pair of electrodes,
    wherein the separator for an electrochemical element according to claim 1 is used as the separator.

6. The electrochemical element according to claim 5, wherein the electrochemical element is an aluminum electrolytic capacitor.

7. The electrochemical element according to claim 5, wherein the electrochemical element is an electric double layer capacitor.

* * * * *